United States Patent
Liu et al.

(10) Patent No.: US 9,591,458 B2
(45) Date of Patent: Mar. 7, 2017

(54) METHOD AND APPARATUS FOR ADAPTIVE POSITIONING

(71) Applicant: MARVELL WORLD TRADE LTD, St. Michael (BB)

(72) Inventors: BoChih Liu, Shanghai (CN); Zhike Jia, Fremont, CA (US); Jian Chen, Shanghai (CN); Jing Yu, Shanghai (CN); Xin Zhang, Shanghai (CN); Liujun Shao, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/644,644

(22) Filed: Mar. 11, 2015

(65) Prior Publication Data

US 2015/0264534 A1    Sep. 17, 2015

Related U.S. Application Data

(60) Provisional application No. 61/951,786, filed on Mar. 12, 2014, provisional application No. 61/988,999, filed on May 6, 2014.

(51) Int. Cl.
*H04W 24/00* (2009.01)
*H04W 4/04* (2009.01)
(Continued)

(52) U.S. Cl.
CPC .............. *H04W 4/04* (2013.01); *G01S 19/48* (2013.01); *G01S 19/49* (2013.01); *H04L 67/303* (2013.01); *H04W 4/027* (2013.01); *H04W 4/028* (2013.01)

(58) Field of Classification Search
CPC ....... H04W 16/14; H04W 64/00; H04W 4/22; H04W 88/06; H04W 4/04; H04W 4/027;
(Continued)

(56) References Cited

U.S. PATENT DOCUMENTS 7,313,402 B1    12/2007  Rahman
9,026,135 B2     5/2015  Takahashi
(Continued)

OTHER PUBLICATIONS

Authorized Officer Sylvia Lampreia, Invitation to Pay Additional Fees, International Application No. PCT/US2014/034568, mailed Nov. 21, 2014, 6 pages.
(Continued)

*Primary Examiner* — Charles Appiah
*Assistant Examiner* — Alexander Yi

(57) ABSTRACT

The present disclosure provides methods and apparatus for adaptively performing position determination in response to environmental profile determination. Aspects of the disclosure provide an apparatus including a sensor, an environmental profile determination module, and a profile based position provider. The sensor is configured to generate data indicative of motions of the apparatus. The environmental profile determination module is configured to receive the data indicative of the motions of the apparatus, and detect an environmental profile from a plurality of environmental profiles for the apparatus based on the data. The profile based position provider includes a plurality of configurations associated with the plurality of environmental profiles. The profile based position provider is configured in one of the configurations associated with the environmental profile, and is configured to select a positioning source to determine a location of the apparatus based on the configuration.

20 Claims, 7 Drawing Sheets

(51) Int. Cl.
*G01S 19/48* (2010.01)
*G01S 19/49* (2010.01)
*H04L 29/08* (2006.01)
*H04W 4/02* (2009.01)

(58) Field of Classification Search
CPC ...... H04W 4/028; H04B 1/0475; G01P 15/18; G06F 3/011; G08B 19/00; G08B 25/10; G08B 13/1427; G01S 19/48; G01S 19/49; H04L 67/303
USPC ........... 455/63.1, 114.2, 456.1, 404.2, 552.1; 701/209, 217; 702/141, 150; 340/521, 340/539.3, 539.21; 342/357.15
See application file for complete search history.

(56) References Cited

U.S. PATENT DOCUMENTS

| | | | |
|---|---|---|---|
| 2005/0130677 A1* | 6/2005 | Meunier | G01S 5/021 455/456.6 |
| 2005/0253755 A1* | 11/2005 | Gobara | G01S 19/28 342/357.67 |
| 2006/0119476 A1* | 6/2006 | Hope | G08B 13/1427 340/521 |
| 2007/0049295 A1 | 3/2007 | Soliman | |
| 2007/0243829 A1 | 10/2007 | Nagato | |
| 2009/0005975 A1* | 1/2009 | Forstall | G01C 21/20 701/533 |
| 2009/0196267 A1 | 8/2009 | Walker | |
| 2009/0291641 A1 | 11/2009 | Sato | |
| 2011/0018732 A1 | 1/2011 | Cho | |
| 2011/0189960 A1 | 8/2011 | Bhattacharya | |
| 2011/0316880 A1 | 12/2011 | Ojala | |
| 2012/0221244 A1 | 8/2012 | Georgy | |
| 2013/0237245 A1 | 9/2013 | Tinnakornsrisuphap | |
| 2014/0004876 A1* | 1/2014 | Fuller | G01C 21/206 455/456.1 |
| 2014/0114568 A1* | 4/2014 | Park | G01S 5/0263 701/469 |
| 2014/0149069 A1 | 5/2014 | Kelly | |
| 2014/0278084 A1* | 9/2014 | Lau | G01S 19/34 701/526 |
| 2014/0335887 A1 | 11/2014 | Liu | |
| 2015/0264534 A1 | 9/2015 | Liu | |

OTHER PUBLICATIONS

Office Action issued on Oct. 7, 2015 in U.S. Appl. No. 14/253,467, filed Apr. 15, 2014.

* cited by examiner

METHOD AND APPARATUS FOR ADAPTIVE POSITIONING

INCORPORATION BY REFERENCE

This present disclosure claims the benefit of U.S. Provisional Application No. 61/951,786, "Using Accelerator Information to Reduce Power Consumption for Short-Range Radio Positioning" filed on Mar. 12, 2014 and U.S. Provisional Application No. 61/988,999, "Seamless Position Determination System Having Mixed Method of Global Positioning System and Micro Electro Mechanical System" filed on May 6, 2014, which are incorporated herein by reference in their entirety.

FIELD

This disclosure relates generally to position determination. More specifically, the disclosure relates to methods and apparatus for adaptively performing position determination for wireless devices in wireless communication networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many mobile applications running on a mobile device, such as a laptop computer, a tablet computer, a smart phone and the like, depend on location information of the mobile device. The location information can be determined by the mobile device or a server device that is in communication with the mobile device.

SUMMARY

Aspects of the disclosure provide an apparatus including a sensor, an environmental profile determination module, and a profile based position provider. The sensor is configured to generate data indicative of motions of the apparatus. The environmental profile determination module is configured to receive the data indicative of the motions of the apparatus, and detect an environmental profile from a plurality of environmental profiles for the apparatus based on the data. The profile based position provider includes a plurality of configurations associated with the plurality of environmental profiles. The profile based position provider is configured in one of the configurations associated with the environmental profile, and is configured to select a positioning source to determine a location of the apparatus based on the configuration.

According to an aspect of the disclosure, the sensor is a microelectromechanical systems (MEMS) sensor configured to generate the data indicative of motions of the apparatus. The environmental profile determination module is configured to detect a static profile based on the data from the MEMS sensor. Then, the profile based position provider is configured to retrieve a previous determined location as a current location of the apparatus. Further, the profile based position provider is configured not to request position update.

According to another aspect of the disclosure, the sensor is a satellite signal receiver configured to receive signals from satellites, and calculate a poor-to-total-satellites ratio (PTSR). The environmental profile determination module is configured to detect the environmental profile from an outdoor profile, a shadow profile and an indoor profile based on the PTSR. In an embodiment, the environmental profile determination module is configured to detect the outdoor profile when the PTSR is below a lower threshold, to detect the indoor profile when the PTSR is above an upper threshold, and to detect the shadow profile when the PTSR is between the lower threshold and the upper threshold.

In an example, the profile based position provider is configured in an outdoor configuration associated with the outdoor profile, and request a position update from a satellite system based positioning source.

In another example, the profile based position provider is configured in a shadow configuration associated with the shadow profile, and request a position update from a microelectromechanical systems (MEMS) sensor based positioning source.

In another example, the profile based position provider is configured in an indoor configuration associated with the indoor profile, and request a position update from a map based positioning source.

In another example, the profile based position provider is configured in an indoor configuration associated with the indoor profile, and request a position update from a wireless local area network (WLAN) based positioning source.

Aspects of the disclosure provide a method for positioning a mobile device. The method includes receiving sensor data indicative of motions of the mobile device, detecting an environmental profile from a plurality of environmental profiles for the mobile device based on the data, configuring a profile based position provider according to a configuration associated with the environmental profile, and selecting a positioning source to determine a location of the mobile device based on the configuration.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
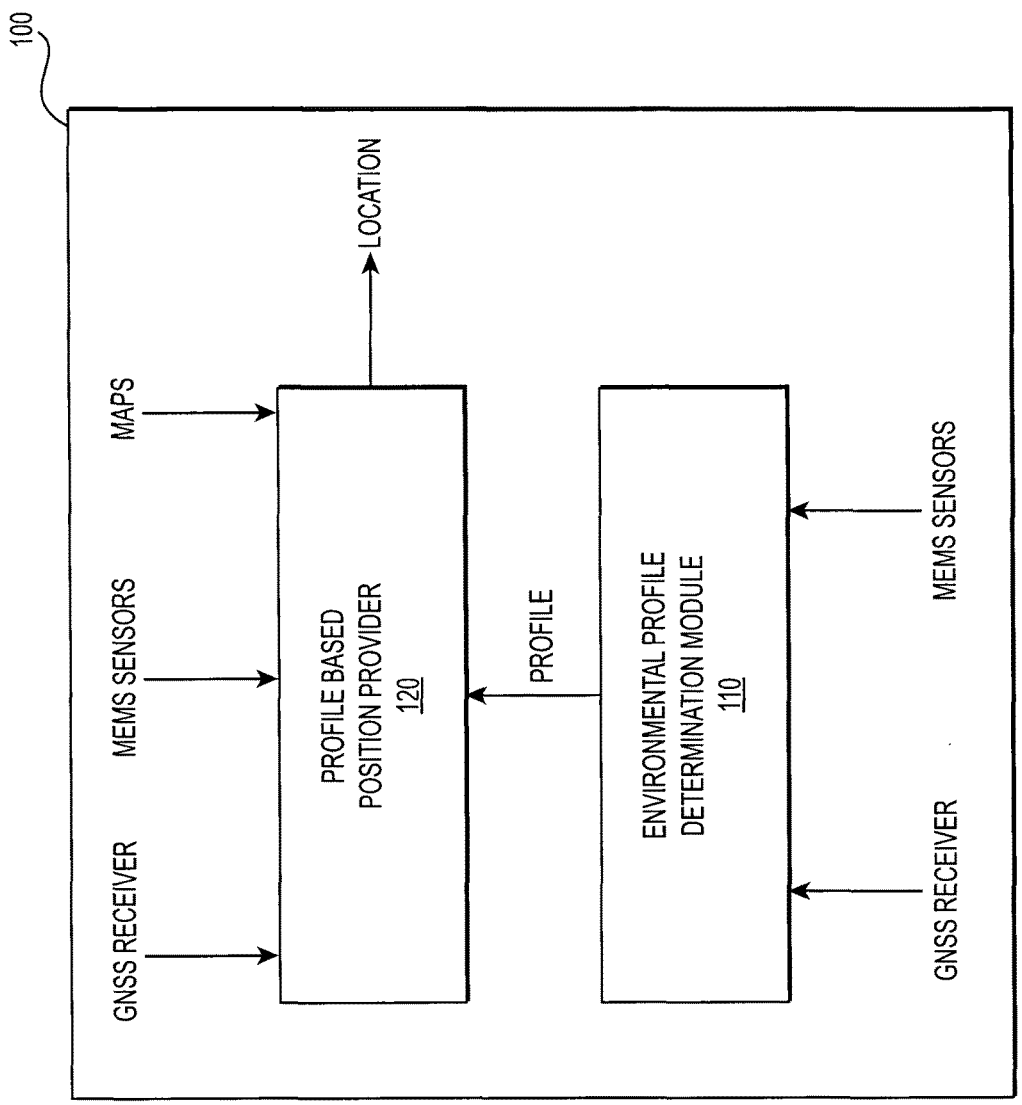
FIG. 1 shows a block diagram of a mobile device 100 according to an embodiment of the disclosure.

FIG. 1 shows a block diagram of a mobile device 100 according to an embodiment of the disclosure. The mobile device 100 includes an environmental profile determination module 110 and a profile based position provider 120 coupled together as shown in FIG. 1. The environmental profile determination module 110 is configured to detect an environmental profile of the mobile device 100 based on sensor signals, and provide the detected environmental profile to the profile based position provider 120. The profile based position provider 120 is configured to select suitable positioning source based on the environmental profile to determine a location of the mobile device 100.

The mobile device 100 can be any suitable device, such as a laptop computer, a tablet computer, a smart phone, a camera, a wearable device, a device installable on vehicles, and the like. According to an aspect of the disclosure, one or more applications installed on the mobile device 100 require the location information of the mobile device 100. In an example, the mobile device 100 is a smart phone 100 belonging to a user who has subscribed an information service, such as a traffic service, a business service, a weather service, and the like, from a service provider. The smart phone 100 executes a mobile application, for example provided by the service provider. In an example, the mobile application requires the location of the smart phone 100, and then provides location dependent information to the user.

Location information can be detected from various positioning sources, such as from a Global Navigation Satellite System (GNSS), a MEMS based positioning system, a map-based positioning system, a server-based positioning system and the like. According to an aspect of the disclosure, different positioning sources are preferred under different environmental situations. In an example, when the mobile device 100 is outside of buildings, the mobile device 100 is able to receive the satellite signals with enough strength, and the satellite-based positioning system is preferred to provide accurate location information. In an example, when the mobile device 100 is inside a building, satellite signals may not have enough strength for location determination, and thus the map-based positioning system is preferred to provide more accurate location information.

In the FIG. 1 example, the mobile device 100 is configured to be able to receive positioning information from two or more positioning sources, and is configured to select a positioning source based on an environmental profile.

Specifically, the mobile device 100 includes various sensors configured to generate sensor signals that are indicative of environmental profiles. In an example, the mobile device 100 includes a satellite signal receiver, such as a Global Navigation Satellite System (GNSS) receiver and the like, configured to receive satellite positioning signals transmitted by a satellite system, such as the Global Positioning System (GPS), the GLObalnaja NAvigatsionnaja Sputnikovaja Sistema (GLONASS) satellite system, the Galileo navigation satellite system, the Beidou navigation satellite system, and the like. Based on the satellite positioning signals, the mobile device 100 can determine the environmental profile.

In an example, based on signal strengths of the satellite position signals, the environmental profile determination module 110 determines whether the mobile device 100 is inside a building or outside of buildings. For example, the environmental profile determination module 110 calculate a poor-to-total satellites ratio (PTSR), which is a ratio of the number of captured satellites with carrier to noise density below a threshold to the total number of captured satellites. The PTSR is indicative of the environmental profile. In an example, a lower threshold and an upper threshold for the PTSR are suitably determined. When the PTSR is below the lower threshold, the environmental profile determination module 110 determines that the mobile device 100 is outside of buildings; when the PTSR is above the lower threshold and below the upper threshold, the environmental profile determination module 110 determines that the mobile device 100 is close to a building; and when the PTSR is above the upper threshold, the environmental profile determination module 110 determines that the mobile device 100 is in inside a building.

In another example, the satellite positioning signals can be processed to determine a location of the mobile device 100. The location is indicative of the environmental profile. For example, the mobile device 100 stores a map database. Based on the map database and the location, the environmental profile determination module 110 determines the environmental profile, such as whether the mobile device 100 is outside of buildings or close to buildings.

In another example, the mobile device 100 includes a microelectromechanical systems (MEMS) sensor, such as a three-axis accelerometer, a gyroscope, and the like configured to provide sensor signals to the environmental profile determination module 110 to detect the environmental profile, such as whether the mobile device 100 is moving or static.

The profile based position provider 120 selects suitable positioning source based on the environmental profile to determine the location of the mobile device 100, and provide the location to the application that requires the location. In an example, when the mobile device 100 is static, the profile based position provider 120 determines to use a previously determined location as a current location of the mobile device 100. For example, the previously determined location is stored at a specific address in a memory, and the profile based position provider 120 accesses the memory, obtains a location stored at the specific address, and provides the location to the application that requires the location.

In another example, when the mobile device 100 is outside buildings, the profile based position provider 120 determines to use a GNSS based positioning source. For example, the profile based position provider 120 receives signals from the GNSS receiver, performs position, velocity, and time (PVT) calculation to determine the location of the mobile device 100. Then, the profile based position provider 120 provides the location to the application that requires the location.

In another example, when the mobile device 100 is near a building, the profile based position provider 120 selects to use a method that combines information from the GNSS receiver and the MEMS sensors. For example, the mobile device 100 receives signals from the GNSS receiver and determines a location of the mobile device 100 as an initial location. In addition, the mobile device 100 receives signals from the MEMS sensors and calculates a step length in an example. Further, the profile based position provider 120 receives signals from the MEMS sensors, and determines orientation shift and distance shift from, for example, the initial location. Based on the initial location, the orientation shift and the distance shift, the profile based position provider 120 determines the new location of the mobile device 100 and provides the new location to the application that requires the location information. It is noted that, in an example, the profile based position provider 120 uses the GNSS receiver based location information to calibrate the MEMS sensor parameters.

In another example, when the mobile device 100 is in a building, the profile based position provider 120 selects to use a method that combines information from the MEM sensors and an indoor floor map. For example, the mobile device 100 receives signals from the MEMS sensors, and determines orientation shift and distance shift from a previously determined location. Based on the previously determined location and the orientation shift and the distance shift, the profile based position provider 120 determines the new location of the mobile device 100. Further, the profile based position provider 120 matches the new location on the indoor floor map to correct the new location.

It is noted that the environmental profile determination module 110 and the profile based position provider 120 can be implemented by various technique, such as software, hardware, and the like. In an example, the environmental profile determination module 110 and the profile based position provider 120 are implemented as software instructions to be executed by a processor (not shown) in the mobile device 100. The environmental profile determination module 110 and the profile based position provider 120 communicate with hardware components, such as the GNSS receiver, the MEMS sensors via suitable interfaces (e.g., software interface, hardware interface).

Figure 2:
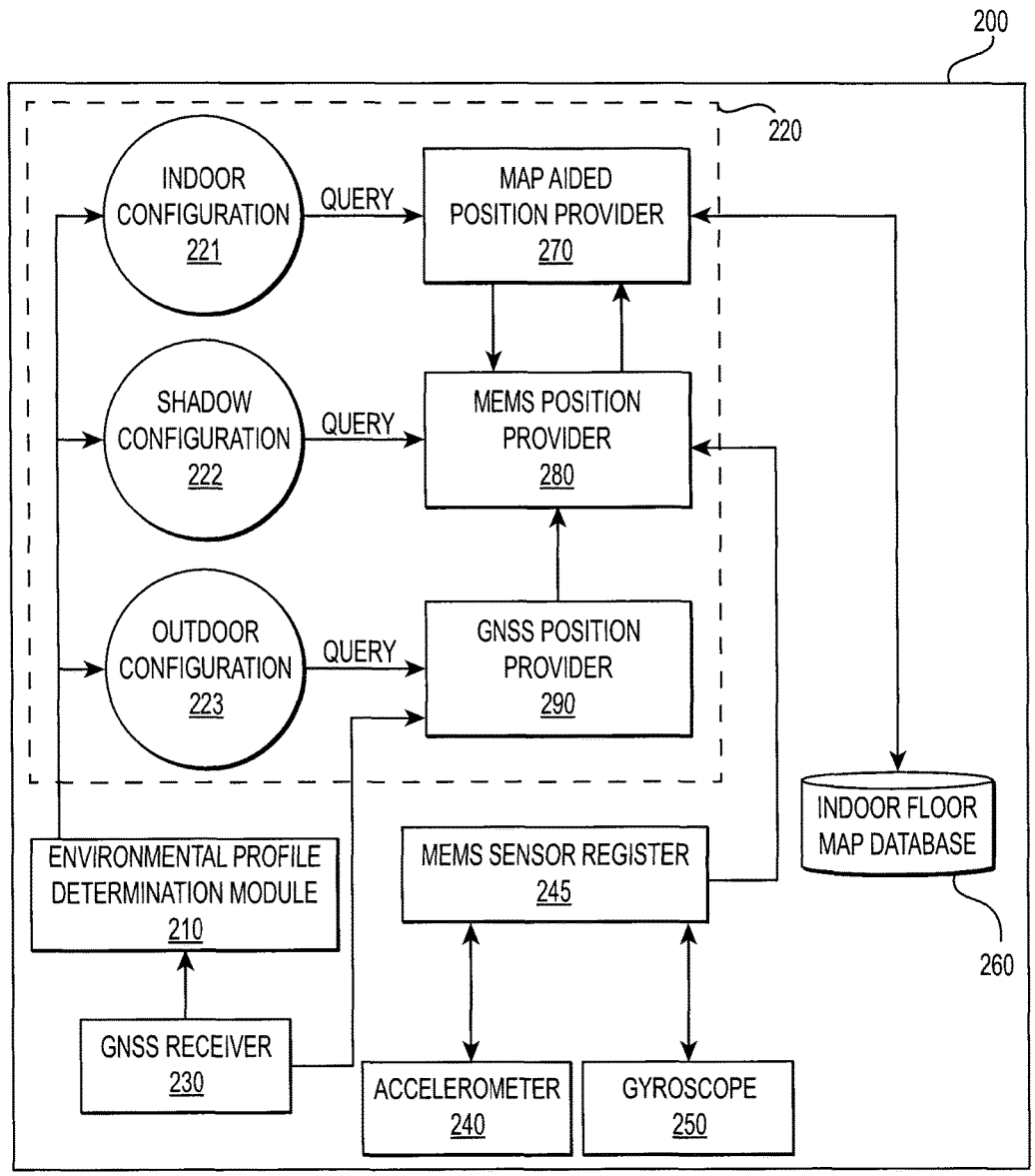
FIG. 2 shows a block diagram of a mobile device 200 according to an embodiment of the disclosure.

FIG. 2 shows a detailed block diagram of a mobile device 200 according to an embodiment of the disclosure. The mobile device 200 includes an environmental profile determination module 210, a profile based position provider 220, a GNSS receiver 230, an accelerometer 240, a gyroscope 250 and an indoor floor map database 260. These elements are coupled together as shown in FIG. 2.

The mobile device 200 can be any suitable device, such as a laptop computer, a tablet computer, a smart phone, a camera, a wearable device, a device installable on vehicles, and the like. The GNSS receiver 230 is configured to receive satellite positioning signals transmitted by a satellite system, such as the Global Positioning System (GPS), the GLObalnaja NAvigatsionnaja Sputnikovaja Sistema (GLONASS), the Galileo navigation satellite system, the Beidou navigation satellite system, and the like. The satellite position signals can be used to determine the location of the mobile device 200.

The accelerometer 240 and the gyroscope 250 are MEMS sensors. The accelerometer 240 is configured to detect an acceleration magnitude, and the acceleration magnitude is used for detecting step event. In an example, peaks in the acceleration magnitude are indicative of steps. The MEMS position provider 280 uses peak detection to detect peaks in the acceleration magnitude, and thus to identify distinct steps. In another example, the MEMS position provider 280 calculates differential acceleration, and uses zero-crossing detection and flat zone detection in the differential acceleration to identify distinct steps.

In an embodiment, when the distinct steps are identified, the MEMS position provider 280 estimates a step length based on the acceleration amplitude. In another embodiment, the MEMS position provider 280 is configured to estimate the step length based on acceleration, walking frequency, or a linear combination of the acceleration and the walking frequency.

The gyroscope 250 is configured to detect a motion orientation. It is noted that the accelerometer 240 and the gyroscope 250 can be replaced by other suitable sensors to detect the motion acceleration and the motion orientation. In the FIG. 2 example, the mobile device 200 includes a MEMS sensor register 245 configured to store the detected motion data, such as the acceleration and orientation.

The indoor floor map database 260 is configured to store floor maps inside building, and provide suitable floor maps to the profile based position provider 220 to assist location determination. In an example, the indoor floor map database defines an indoor structure using link, node, and region. A link represents a passageway along which pedestrians can walk. A region represents an area within which boundary pedestrians can walk. A node represents a connection between two links, or a connection between a link and a region.

The environmental profile determination module 210 is configured to receive signals from the GNSS receiver 230, detect an environmental profile, such as an indoor profile, a shadow profile, an outdoor profile and the like, based on the signals from the GNSS receiver 230, and provide the detected environmental profile to the profile based position provider 220.

In the FIG. 2 example, the profile based position provider 220 includes multiple position providers, such as a map aided position provider 270, a MEMS position provider 280, a GNSS position provider 290, and the like that use different techniques to determine the location of the mobile device 200. Further, the profile based position provider 220 has multiple configurations, such as an indoor configuration 221, a shadow configuration 222 and an outdoor configuration 223 associated with the position providers.

In an embodiment, when the profile based position provider 220 receives the environmental profile, the profile based position provider 220 is configured in one of the multiple configurations according to the environmental profile, and send query to one of the position providers associated with the configuration. The position provider then determines the location of the mobile device 200 accordingly.

Figure 3:
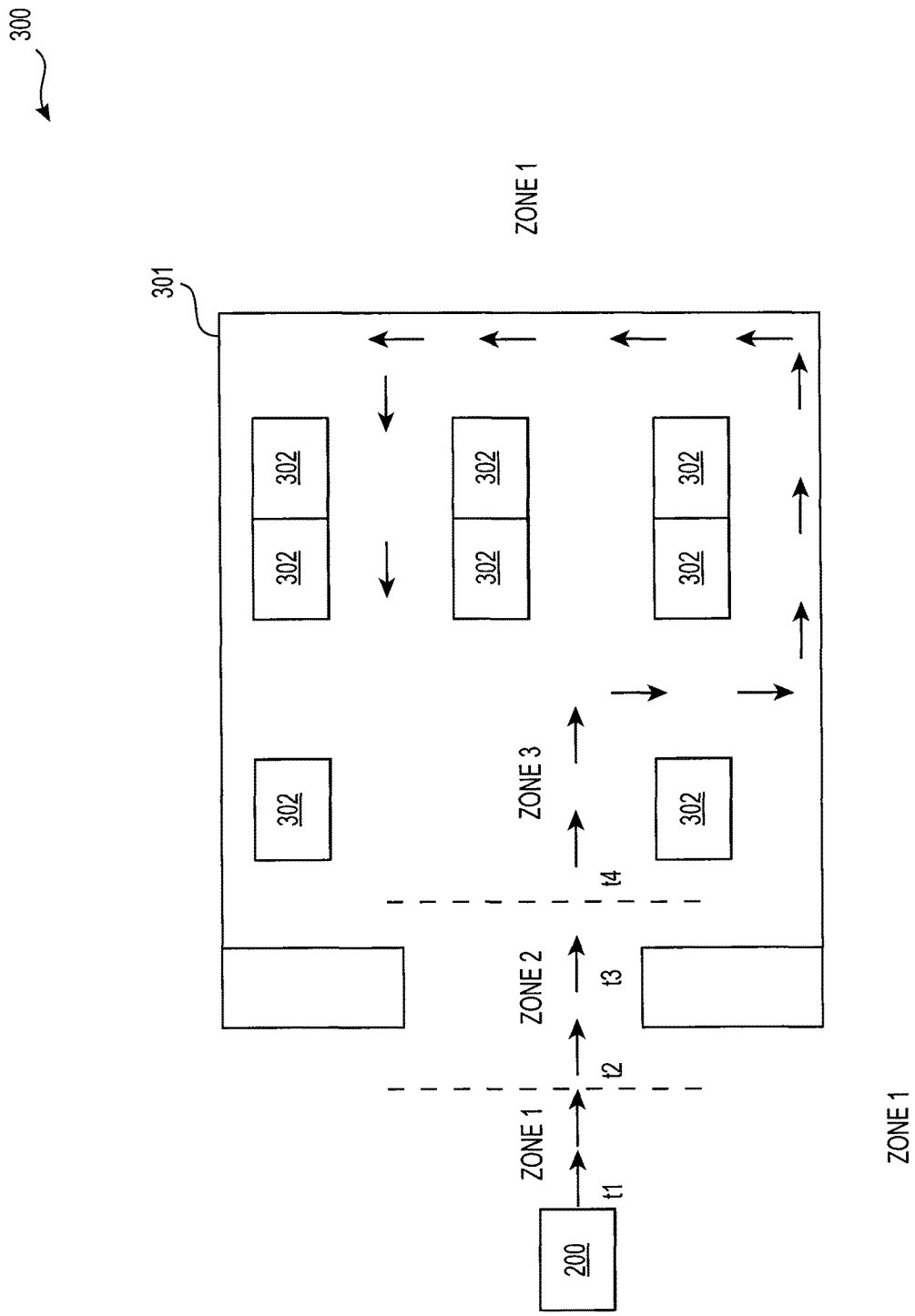
FIG. 3 shows a plot of a location determination scenario according to an embodiment of the disclosure.

FIG. 3 shows a plot 300 to illustrate different environmental profiles, and to illustrate operations of the mobile device 200 in the different environmental profiles according to an embodiment of the disclosure. The plot 300 shows a building 301, and a floor map inside the building 301. Inside the building 301, space 302 is occupied.

In an embodiment, the GNSS receiver 230 receives satellite signals, and provides satellite signal information to the environmental profile determination module 210 to detect the environmental profile. In an example, the satellite signal information includes the total number of satellites and the number of satellites with weak carrier-to-noise density. In an example, the environmental profile determination module 210 calculates a parameter that is indicative of the environmental profile based on the satellite signal information. For example, the environmental profile determination module 210 calculates the PTSR, which is a ratio of the number of captured satellites with carrier to noise density below a threshold to the total number of captured satellites.

The PTSR is indicative of the environmental profile. In an example, a lower threshold and an upper threshold for the PTSR are suitably determined. When the PTSR is below the lower threshold, the environmental profile determination module 210 determines that the mobile device 200 is outside of buildings and has an outdoor profile; when the PTSR is above the lower threshold and below the upper threshold, the environmental profile determination module 210 determines that the mobile device 200 is close to a building and has a shadow profile; and when the PTSR is above the upper threshold, the environmental profile determination module 210 determines that the mobile device 200 is in inside a building, and has an indoor profile.

In an embodiment, the mobile device 200 traces changes of the environmental profiles and dynamically selects the suitable position provider accordingly. In the FIG. 3 example, a user whom the mobile device 200 belongs to walks outside the building 301 and then enters the building 301 and walks inside the building 301 as shown by arrows in FIG. 3. For example, from time t1 to time t2, the user walks outside the building 301 in zone 1; from time t2 to time t4, the user enters the building 301 from an entrance in zone 2; and after time t4, the user walks inside the building 301 in zone 3.

According to an aspect of the disclosure, during a first time duration from time t1 to t2, the environmental profile determination module 210 calculates the PTSR and detects that the PTSR is below the lower threshold. Thus, the environmental profile determination module 210 determines that the mobile device 200 has an outdoor profile. The environmental profile determination module 210 provides the outdoor profile information to the profile based position provider 220. The profile based position provider 220 is configured into the outdoor configuration 223. In the outdoor configuration 223, a position query is sent to the GNSS position provider 290. The GNSS position provider 290 determines an absolute location of the mobile device 200 based on received GNSS signals from the GNSS receiver 230. The absolute location is provided to suitable applications that require the location information.

It is noted that, in an example, the environmental profile determination module 210 periodically (e.g., once a second) determines the environmental profile, and provide the environmental profile to the profile based position provider 220 to select the associated position provider accordingly.

Further, starting at time t2 and during a second time duration from time t2 to t4, the environmental profile determination module 210 calculates the PTSR and detects that the PTSR is above the lower threshold and below the upper threshold. Thus, the environmental profile determination module 210 determines that the mobile device 200 has a shadow profile. The environmental profile determination module 210 provides the shadow profile information to the profile based position provider 220. The profile based position provider is configured into the shadow configuration 222. In the shadow configuration, a position query is sent to the MEMS position provider 280. The MEMS position provider 280 receives MEMS sensor information, and determines the location of the mobile device 200 based on the MEMS sensor information.

It is noted that, at time t2, the mobile device 200 is still able to receive the GNSS signals to determine the absolute location. In an example, the MEMS position provider 280 combines information from the GNSS position provider 290 and the MEMS sensor information to determine the location of the mobile device 200. In an example, the MEMS position provider 280 collects information from the GNSS position provider 290 to build a step model for identifying steps. For example, when the peak detection fails to detect a step event, the step model is able to mark a step to compensate for the step event detection. In addition, in an example, the step model can be used to calibrate the coefficients for step length estimation.

In an embodiment, based on the MEMS sensor information, the MEMS position provider 280 determines orientation shift and distance shift to a previously determined location, and then determines the new location.

It is further noted that, when the user walks further in zone 2, for example at time t3 that is later than time t2 and earlier than time t4, the GNSS signals received by the mobile device 200 get weaker, and MEMS position provider 280 is able to provide more accurate location determination than the GNSS position provider 290. In an embodiment, the MEMS position provider 280 uses a Kalman filter to statistically analyze the GNSS signals, the acceleration magnitude, and the orientation to determine the new location of the mobile device 200. It is noted that the MEMS position provider 280 can use any other suitable statistical algorithm that combines imprecise estimates of a value and produces a more precise estimation.

In an example, starting at t4, the environmental profile determination module 210 calculates the PTSR and detects that the PTSR is above the upper threshold. Thus, the environmental profile determination module 210 determines that the mobile device 200 has an indoor profile. The environmental profile determination module 210 provides the indoor profile information to the profile based position provider 220. The profile based position provider 220 is configured into the indoor configuration 221. In the indoor configuration, a position query is sent to the map aided position provider 270. The map aided position provider 270 receives MEMS sensor information from the MEMS position provider 280 and an indoor floor map from the indoor floor map database 260, and determines the location of the mobile device 200 based on the MEMS sensor information and the indoor floor map.

Specifically, at time t4, the map-aided position provider 270 uses the location and orientation last determined by the MEMS position provider 280 as an initial known location and orientation, and performs a map-matching operation to determine a matched location and a matched link in the indoor floor map. The matched location is designated as an updated location at time t4. In an example, the updated location more accurately represents the location of the mobile device 200 than the initial known location that is determined by the MEMS position provider 280. Further, in an example, the map-aided position provider 270 is configured to perform orientation calibration based on the updated location, and the calibrated orientation more accurately represents the orientation of movement of the mobile device than the initial orientation determined by the gyroscope 250 for example. The calibrated orientation can be sent back to the MEMS position provider 280 for further determining the position of the mobile device 200.

Following time t4, when the user walks in the building, the map-aided position provider 270 continues to update the location of the mobile device 200 determined by the MEMS position provider 280 based on the indoor floor map to trace a route of mobile device 200.

According to an aspect of the disclosure, when the mobile device 200 is in the building, the mobile device 200 interacts with the user to get the initial location through user input. In an example, the mobile device 200 provides a floor view on a touch screen of the mobile device 200, and accepts user input using, for example, a thumb to set a current location on the floor view shown on touch screen. In such a case, the MEMS position provider 280 and map-aided position provider 270 operate together to provide the location of the mobile device 200 to trace the route of the mobile device 200.

It is noted that the profile based position provider 220 can have other suitable configuration and position provider. In an example, the profile based position provider 220 includes another indoor configuration (not shown) associated with an access point based position provider (not shown). When the building 301 is equipped with wireless access points, the mobile device 200 is able to detect WiFi signals from the wireless access points. Thus, when the user enters the builder 301, the environmental profile determination module 210 detects the indoor profile, and the profile based position provider 220 is configured according to the other indoor configuration to use the access point based position provider to determine the location of the mobile device 200.

Figure 4:
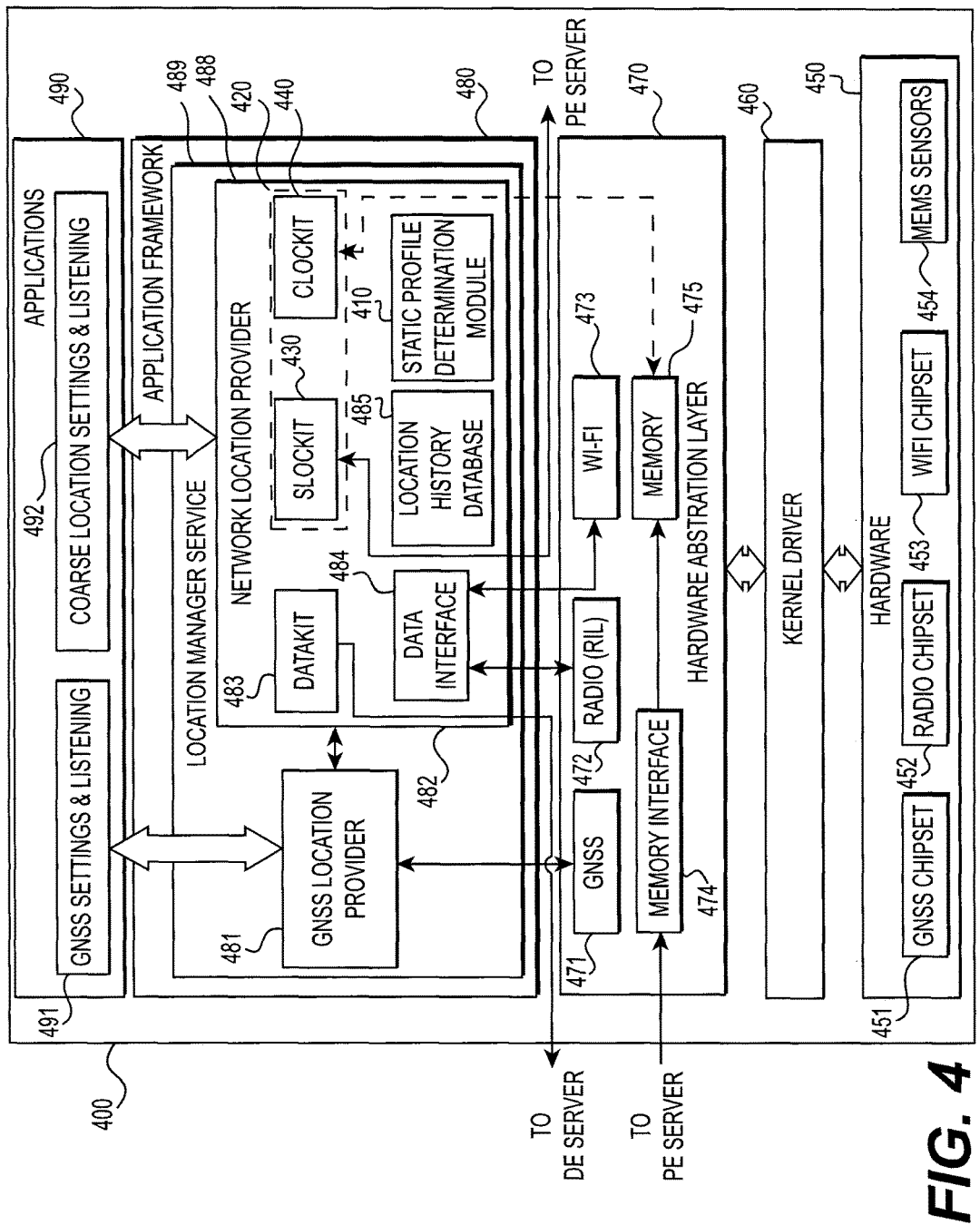
FIG. 4. shows a block diagram of a mobile device 400 according to an embodiment of the disclosure.

FIG. 4 shows a block diagram of a mobile device 400 according to an embodiment of the disclosure. The mobile device 400 includes a static profile determination module 410 and a profile based position provider 420 coupled together as shown in FIG. 4. The static profile determination module 410 is configured to detect the environmental profile of the mobile device 400, such as a static profile, based on sensor signals, and provide the environmental profile to the profile based position provider 420. The profile based position provider 420 is configured to select suitable positioning source based on the environmental profile to determine a location of the mobile device 400. In an example, when the mobile device 400 has a static profile, the profile based position provider 420 uses the previously determined location as a current location of the mobile device 400, and maintains hardware components for location determination in a power saving mode to save power.

According to an aspect of the disclosure, the mobile device 400 is configured to be able to determine location from various signals, such as from satellite signals in a GNSS system, radio signals in a cellular system, WiFi signals in a wireless local area network (WLAN) system, and the like. In an example, the GNSS system based location determination provides relatively more accurate location than the cellular system location determination and the WLAN system based location determination.

Further, in the FIG. 4 example, the mobile device 400 is implemented using a five-layer architecture. The five architecture layers include an application layer 490, an application framework layer 480, a hardware abstraction layer 470, a kernel driver layer 460 and a hardware layer 450. Each layer is configured to enable the GNSS system based location determination, the cellular system and the WLAN system based location determination.

Specifically, in the FIG. 4 example, the application layer 490 includes a GNSS setting/listening module 491 and a coarse location setting/listening module 492. When the GNSS setting/listening module 491 is started, the location of the mobile device 400 can be determined based on the GNSS system and the determined location is provided to the application layer 490. When the coarse location setting/listening module 492 is started, the location of the mobile device 400 can be determined based on the cellular system and/or the WLAN system and the determined location is provided to the application layer 490.

Further, the application framework layer 480 includes a location manager service 489 to manage the location request/response, and provide the determined location to the application layer 490. The location manager service 489 includes a GNSS location provider 481 and a network location provider 488. The GNSS location provider 481 is configured to process the satellite signals in the GNSS system to determine the location in response to a location request. The network location provider 489 is configured to process the radio signals in the cellular system or WiFi signals in the WLAN system to determine the location in response to location request.

In the FIG. 4 example, the network location provider 488 further includes a data kit (DataKit) 483, the profile based position provider 420, a location history database 485, data interface 484 and the static profile determination module 410. The profile based position provider 420 further includes a server location kit (SLocKit) 430 and a client location kit (CLocKit) 440. In an embodiment, data kit 483 collects the position data from the GNSS location provider 481, integrates the radio/WiFi signal data with the GNSS position data based on filtering conditions, and provides the integrated data to data engine (DE) server through application programming interfaces (APIs).

In the embodiment, the server location kit 430 collects the scanned radio signal data and/or WiFi signal data, sends the scanned data through APIs to request the location from positioning engine (PE) server, and receives the response of the geographic location through APIs. In the embodiment, the client location kit 440 collects the scanned WiFi radio signal data, sends the scanned data to a memory to ask WiFi assistance data, and determines the location by using the WiFi assistance data.

In the embodiment, the location history database 485 stores the position information obtained from the server location kit 430 or the client location kit 440. In the embodiment, the data interface 484 allows kits in network location provider 488 to start/end capture of radio signal data and WiFi signal data.

In the FIG. 4 example, the hardware abstraction layer 470 includes a GNSS processing abstraction 471, a radio processing abstraction 472, and a WiFi processing abstraction 473, a memory interface abstraction 474 and a memory abstraction 475. In an embodiment, the GNSS processing abstraction 471, the radio processing abstraction 472 and the WiFi processing abstraction 473 are implemented in software. In an embodiment, the memory interface abstraction 474 receives the WiFi assistance data from PE server and sends the received data to the memory abstraction 475. The memory abstraction 475 stores the WiFi assistance data under a hierarchical folder structure. The hardware layer 450 includes a GNSS chipset 451 configured for GNSS processing, a radio chipset 452 configured for radio processing, a WiFi chipset 453 configured for WiFi processing and MEMS sensors 454 configured to sense motions of the mobile device 400. The GNSS processing abstraction 471, the radio processing abstraction 472 and the WiFi processing abstraction 473 interact with their corresponding hardware components in the hardware layer 450 via the kernel driver layer 460.

The MEMS sensors 454 can include any suitable sensor, such as a three-axis accelerometer sensor, and the like to sense motions of the mobile device 400. The sensor data is provided to the static profile determination module 410 via a register (not shown).

In the FIG. 4 example, the mobile device 400 is configured to perform a server based location determination based on the cellular system and/or the WLAN system and a client based location determination based on the WLAN system. For the server based location determination, the radio chipset 452 and/or the WiFi chipset 453 is activated to perform signal scan and then communicate with a server over a cellular network or a WiFi network, such as disclosed in Assignee's co-pending application Ser. No. 14/260,849, filed Apr. 24, 2014, which is incorporated herein by reference in its entirety.

For the client based location determination, the WiFi chipset 453 is activated to perform signal scan to collect scan data and determine the location of the mobile device 400 based on the scan data.

According to an aspect of the disclosure, the signal scan and communication operations of the radio chipset 452 and/or the WiFi chipset 453 consume relatively large power. When the static profile determination module 410 detects that the mobile device 400 is still and not moving, the profile based position provider 420 is configured to retrieve a previously determined location as the current location, thus the radio chipset 452 and the WiFi chipset 453 do not need to be activated frequently and can stay in a power saving mode to save power.

Figure 5:
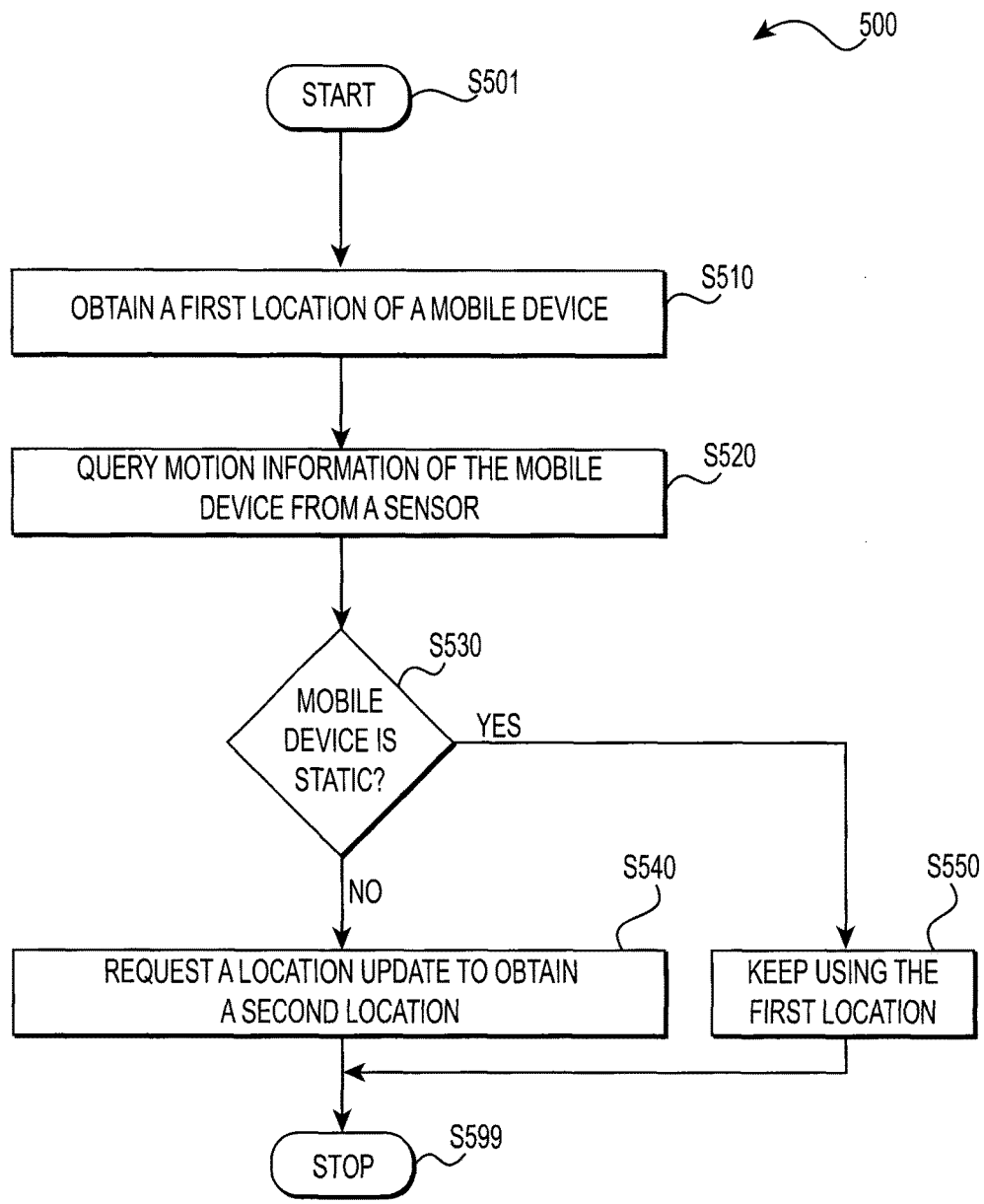
FIG. 5 shows a flow chart outlining a process example 500 according to an embodiment of the disclosure.

FIG. 5 shows a flow chart outlining a process example 500 according to an embodiment of the disclosure. In an example, the process 500 is executed by the mobile device 400. The process starts at S501 and proceeds to S510.

At S510, a first location of a mobile device is determined. The first location can be determined by various techniques. In an example, the first location is determined based on the GNSS system. In another example, the first location is determined based on the cellular system. In another example, the first location is determined based on the WLAN system. Specifically, the WiFi chipset 453 scans signals from nearby access points. Based on signal strengths, and the locations of the access points, the mobile device 400 is able to estimate the first location.

At S520, motion information of the mobile device is sensed. In an example, before a time for generating a next position update request, the MEMS sensors 454, such as a three-axis accelerometer sensor, and the like, generates sensor data indicative of the motion information of the mobile device 400, and provides the sensor data to the static profile determination module 410.

At S530, a static decision is made and the process proceeds based on the static decision. In an example, the static profile determination module 410 determines whether the mobile device 400 is static based on the sensor data. When the mobile device 400 is static, the process proceeds to S550; otherwise, the process proceeds to S540.

At S540, a position update request is generated to obtain a second position, for example, from one of the GNSS system, the cellular system, and the WiFi system. Then the process proceeds to S599 and terminates.

At S550, the first location is retrieved and used as the current location. In an example, the mobile device 400 prohibits the position update request, such that the GNSS chipset 451, the radio chipset 452 and the WiFi chipset 453 can stay in a power saving mode to save power. Then the process proceeds to S599 and terminates.

Figure 6:
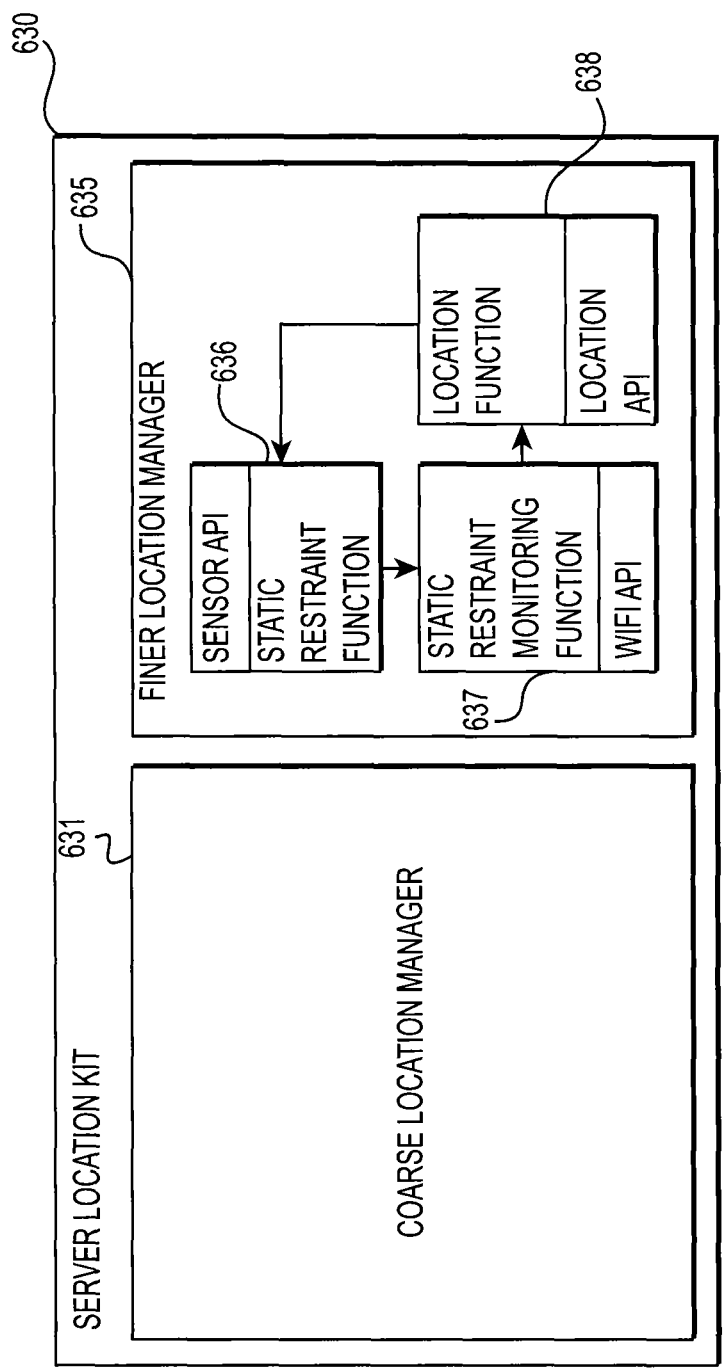
FIG. 6 shows a block diagram of a server location kit 630 according to an embodiment of the disclosure.

FIG. 6 shows a block diagram of a server location kit 630 according to an embodiment of the disclosure. In an example, the server location kit 630 is used in the mobile device 400 as the server location kit 430. The server location kit 630 includes a coarse location manager 631 and a finer location manager 635.

In an embodiment, the coarse location manager 631 is configured to manage the location request/response in wide area radio systems, such as a global system for mobile (GSM) communication system, a wideband code division multiple access (WCDMA) communication system, a time division synchronous code division multiple access (TD-SCDMA) communication system, a long-term evolution (LTE) communication system and the like.

The finer location manager 635 manages the location request/response in short range radio systems, such as a WiFi system, a Bluetooth system, a Zigbee system, and the like.

In the FIG. 6 example, the finer location manager 635 includes a location function 638, a static restraint function 636, and a static restraint monitoring function 637. The location function 638 is configured to retrieve a current location via a location application program interface (API). In an example, the current location is obtained from a positioning engine server (not shown) in a short range radio system via the location API. In addition to retrieving current location, the location function 638 is configured to retrieve estimated location accuracy via the location API and register a time for receiving position information.

Further, the static restraint function 636 is configured to request values of the 3-axis accelerometer via sensor API before a time to request a next location update. The static restraint function 636 is also configured to calculate the variance of 3-axis accelerometer values as a numerical value. The static restraint monitoring function 637 is configured to obtain finer location identifiers through WiFi API. In an example, the finer location identifiers can use MAC addresses due to the reason that MAC address is unique identifier for WiFi access point. In addition to the finer location identifiers, the static restraint monitoring function 637 is configured to record a radio signal reading, such as signal strength, and the like, associated with a MAC address. The static restraint monitoring function 637 can also monitor a numerical value retrieved from the static restraint function 636 to identify a location update opportunity. Upon receiving information on the numerical value, the static restraint monitoring function 637 can compare the received information with default information (e.g. pre-defined value). When the received information reaches over the default information, the static restraint monitoring function 637 requests WiFi API to collect MAC address and radio signal reading at a time and can pass the MAC address and the radio signal reading to the location function 638 to request the location update through location API. When the received information reaches below the default information, the static restraint monitoring function 637 does not need to collect MAC address and radio signal reading, and the mobile device 400 saves power.

Figure 7:
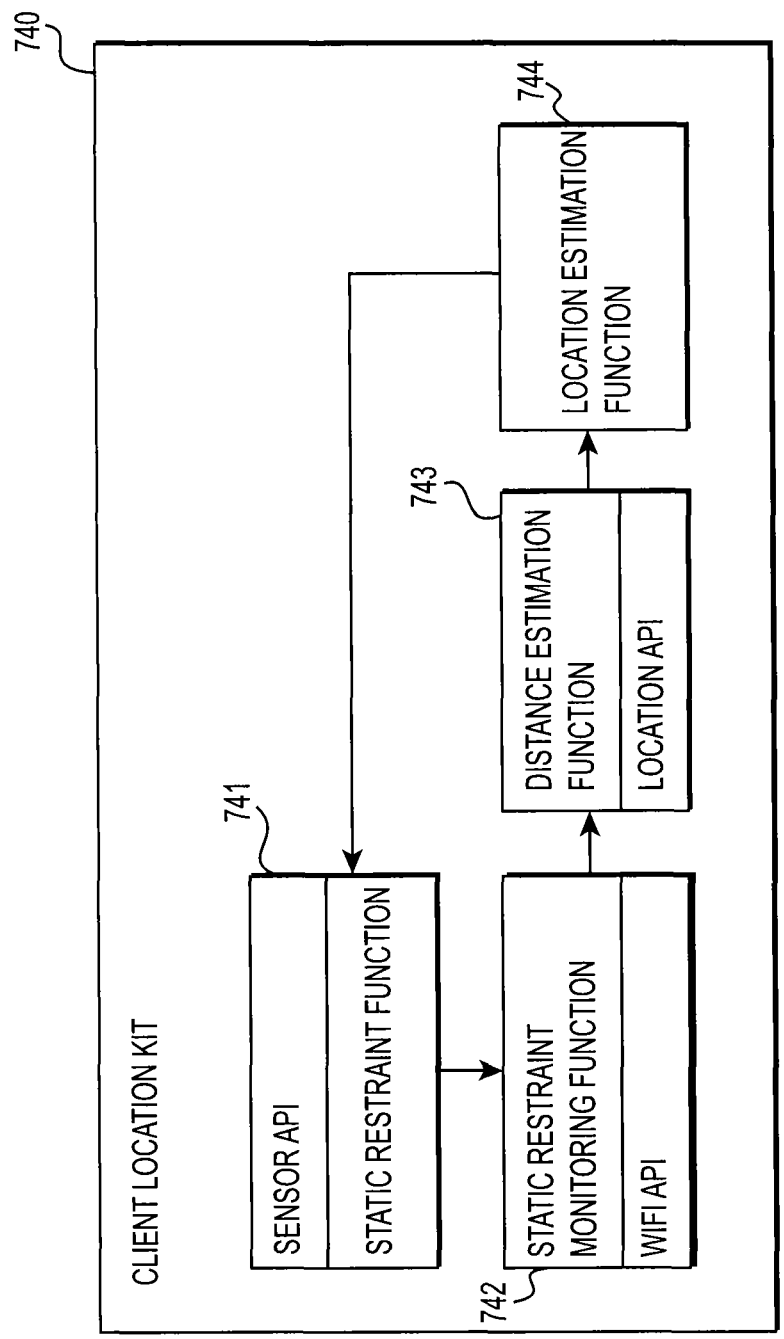
FIG. 7 shows a block diagram of a client location kit 740 according to an embodiment of the disclosure.

FIG. 7 shows a block diagram of a client location kit 740 according to an embodiment of the disclosure. In an example, the client location kit 740 is used in the mobile device 400 as the client location kit 440.

In the FIG. 7 example, the client location kit 740 includes a location estimation function 744, a distance estimation function 743, a static restraint function 741, and a static restraint monitoring function 742. The client location kit 740 manages the location request/response in short range radio systems, such as a WiFi system, a Bluetooth system, a Zigbee system, and the like.

The location estimation function 744 is configured to determine a current location using the estimated distances retrieved from the distance estimation function 743. In an example, the location estimation function 744 uses a multi-lateral algorithm to calculate the current location of mobile device 400. Further, the location estimation function 744 is configured to record a time for estimating position information.

The distance estimation function 743 is configured to retrieve WiFi assistance data from a local memory, such as the memory 475, via the location API. Further, the distance estimation function 743 is configured to determine the distances between the mobile device 400 and WiFi access points. In an example, the distance estimation function 743 uses a polynomial regressive algorithm to determine the distances between the mobile device 400 and WiFi access points.

In an embodiment, the static restraint function 741 is configured to record the 3-axis accelerometer readings via the sensor API. The static restraint function 741 is further configured to calculate the variance of 3-axis accelerometer readings as a numerical value.

Further, in the embodiment, the static restraint monitoring function 742 is configured to obtain and record finer location identifiers through WiFi API. In an example, a finer location identifier includes a MAC address. For example, a MAC address can uniquely identify a WiFi access point. In addition to recording current finer location identifiers, the static restraint monitoring function 742 is further configured to record a radio signal reading associated with a MAC address. The static restraint monitoring function 742 is further configured to monitor a numerical value retrieved from the static restraint function 741 to identify a location update opportunity.

In an example, when the static restraint monitoring function 742 receives the current numerical value, the current numerical value is compared with a pre-defined value. When the received numerical value reaches over the pre-defined value, the static restraint monitoring function 742 collects MAC addresses and radio signal readings via the WiFi API, and provides the collected information to the distance estimation function 743. The distance estimation function 743 then retrieves WiFi assistance data for determining the distances via the location API. Next, the distance estimation function 743 provides the estimated distances to the location estimation function 744 to update the location. When the received numerical value reaches below the pre-defined value, the static restraint monitoring function 742 does not need to collect MAC address and radio signal reading, and the mobile device 400 saves power.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
a sensor configured to generate data indicative of motions of the apparatus;
an environmental profile determination module configured to receive the data indicative of the motions of the apparatus, and detect an environmental profile from a plurality of environmental profiles for the apparatus based on the data;
a profile based position provider including a plurality of configurations associated with the plurality of environmental profiles, the profile based position provider being configured in one of the configurations associated with the environmental profile, and being configured to select a positioning source to determine a location of the apparatus based on the configuration;
a map aided position provider configured to receive the data from the sensor and an indoor map from an indoor floor map database and adjust the location of the apparatus based on the data and the indoor floor map; and
a position provider configured to identify distinct steps of a user of the apparatus based on peaks in an acceleration magnitude measured by the sensor and estimate a length of a step based on an acceleration amplitude, wherein the position provider uses a step model built by a microelectromechanical systems (MEMS) position provider from collecting information from a Global Navigation Satellite System (GNSS) position provider to identify the distinct steps when the position provider fails to identify the distinct steps based on the peaks in the acceleration magnitude measured by the sensor.

2. The apparatus of claim 1, wherein
the sensor is a MEMS sensor configured to generate the data indicative of motions of the apparatus.

3. The apparatus of claim 2, wherein
the environmental profile determination module is configured to detect a static profile based on the data from the MEMS sensor; and
the profile based position provider is configured to retrieve a previous determined location as a current location of the apparatus.

4. The apparatus of claim 3, wherein
the profile based position provider is configured not to request a position update.

5. The apparatus of claim 1, wherein
the sensor is a satellite signal receiver configured to receive signals from satellites, and calculate a poor-to-total-satellites ratio (PTSR); and
the environmental profile determination module is configured to detect the environmental profile from an outdoor profile, a shadow profile and an indoor profile based on the PTSR.

6. The apparatus of claim 5, wherein
the environmental profile determination module is configured to detect the outdoor profile when the PTSR is below a lower threshold, to detect the indoor profile when the PTSR is above an upper threshold, and to detect the shadow profile when the PTSR is between the lower threshold and the upper threshold.

7. The apparatus of claim 6, wherein
the profile based position provider is configured in an outdoor configuration associated with the outdoor profile, and request a position update from the GNSS based positioning source.

8. The apparatus of claim 6, wherein
the profile based position provider is configured in a shadow configuration associated with the shadow profile, and request a position update from a MEMS sensor based positioning source.

9. The apparatus of claim 6, wherein
the profile based position provider is configured in an indoor configuration associated with the indoor profile, and request a position update from a map based positioning source.

10. The apparatus of claim 6, wherein
the profile based position provider is configured in an indoor configuration associated with the indoor profile, and request a position update from a wireless local area network (WLAN) based positioning source.

11. A method for positioning a mobile device, comprising:
receiving sensor data indicative of motions of the mobile device;
detecting an environmental profile from a plurality of environmental profiles for the mobile device based on the sensor data;
configuring a profile based position provider according to a configuration associated with the environmental profile;
selecting a positioning source to determine a location of the mobile device based on the configuration;
receiving the sensor data and an indoor map from an indoor floor map database;
adjusting the location of the mobile device based on the sensor data and the indoor floor map;
identifying distinct steps of a user of the mobile device based on peaks in an acceleration magnitude measured according to the sensor data;

using a step model built by a microelectromechanical systems (MEMS) position from collecting information from a Global Nav Satellite System (GNSS) position provider to identify distinct steps of the user when identifying distinct steps of the user based on the peaks in the acceleration magnitude is unsuccessful; and estimating a length of a step based on acceleration amplitude and the identified distinct steps.

12. The method of claim 11, wherein receiving the sensor data indicative of the motions of the mobile device further comprises:

receiving the sensor data from a MEMS sensor.

13. The method of claim 12, further comprising:

detecting a static profile based on the data from the MEMS sensor; and retrieving a previous determined location as a current location of the mobile device.

14. The method of claim 13, further comprising:

prohibiting a position update from other positioning sources.

15. The method of claim 11, wherein receiving the sensor data indicative of the motions of the mobile device further comprises:

receiving the sensor data from a satellite signal receiver configured to receive signals from satellites;

calculating a poor-to-total-satellites ratio (PTSR); and detecting the environmental profile from an outdoor profile, a shadow profile and an indoor profile based on the PTSR.

16. The method of claim 15, wherein detecting the environmental profile from the outdoor profile, the shadow profile and the indoor profile based on the PTSR further comprises:

detecting the outdoor profile when the PTSR is below a lower threshold;

detecting the indoor profile when the PTSR is above an upper threshold; and detecting the shadow profile when the PTSR is between the lower threshold and the upper threshold.

17. The method of claim 16, wherein configuring the profile based position provider according to an outdoor configuration associated with the outdoor profile; and requesting a position update from the GNSS based positioning source.

18. The method of claim 16, wherein configuring the profile based position provider according to a shadow configuration associated with the shadow profile; and requesting a position update from a MEMS sensor based positioning source.

19. The method of claim 16, wherein configuring the profile based position provider according to an indoor configuration associated with the indoor profile; and requesting a position update from a map based positioning source.

20. The method of claim 16, wherein configuring the profile based position provider according to an indoor configuration associated with the indoor profile; and requesting a position update from a wireless local area network (WLAN) based positioning source.

* * * * *